United States Statutory Invention Registration [19]

[11] Reg. Number: H816

Carder et al. [43] Published: Sep. 4, 1990

[54] STIBINE FILTER AND ANTIMONIAL LEAD ACID BATTERIES

[75] Inventors: James H. Carder, Gaithersburg; Anh H. Le, Silver Spring; Chester M. Dacres, Columbia, all of Md.

[73] Assignee: The United States of America as represented by the Secretary of the Navy, Washington, D.C.

[21] Appl. No.: 880,524

[22] Filed: Jun. 3, 1986

[51] Int. Cl.[5] ..... H01M 2/12

[52] U.S. Cl. ..... 429/86; 429/89; 429/204; 423/210; 423/248

[58] Field of Search ..... 429/86, 89, 57, 53, 429/72; 55/74, 387; 423/210, 248

[56] References Cited

U.S. PATENT DOCUMENTS

| | | | |
|---|---|---|---|
| 2,615,062 | 10/1952 | Craig | 429/86 |
| 3,038,954 | 6/1962 | Pattison et al. | 429/86 |
| 3,102,059 | 8/1963 | Harmer | 429/57 |
| 3,944,403 | 3/1976 | Simpson et al. | 55/387 X |
| 4,048,387 | 9/1977 | Lahme et al. | 429/50 |
| 4,133,660 | 1/1979 | Steiner | 55/387 |
| 4,559,066 | 12/1985 | Hunter et al. | 55/387 X |

FOREIGN PATENT DOCUMENTS 121339 10/1984 European Pat. Off. .

1405980 9/1975 United Kingdom .

OTHER PUBLICATIONS

Karabanov et al., *Zh. Fiz Khim.*, vol. 50, No. 1, pp. 180–182, (1976).

Karabanov et al., abstracted in *Chemical Abstracts*, vol. 84, #127060; (1976).

*Merck Index*, Windholz et al., Ed., Rahway, N.J., pp. 102, 1260, (1983), 10th Edition.

*Primary Examiner*—Anthony Skapars

*Assistant Examiner*—Valerie D. Fee

*Attorney, Agent, or Firm*—Kenneth E. Walden; Roger D. Johnson

[57] ABSTRACT

Stibine is removed from gases generated in antimonial lead-acid batteries by using a filter having carbon powder (especially activated charcoal) as the active agent.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STIBINE FILTER AND ANTIMONIAL LEAD ACID BATTERIES

BACKGROUND OF THE INVENTION

This invention relates to storage cells and more particularly to stibine filters antimonial lead acid storage cells.

It has long been known that the addition of small amounts of antimony to lead produces lead electrode having greatly improved mechanical properties. This substantially increases the life of lead-acid batteries.

Unfortunately, stibine (antimony hydride, $SbH_3$) can be generated in significant amounts in a lead-acid battery containing a lead-antimony alloy positive grid in over-charge conditions. Stibine is a very toxic antimony compound. The physiological effect of stibine is similar to that of arsine ($AsH_3$) It attacks the central nervous systems and the red blood cells. Symptoms of stibine poisoning are headache, weakness, slow respiration, and depressed body temperature and blood pressure. After absorption into the red blood cells, some of the antimony is transferred to the tissue of various organs. It is found that the antimony concentration is higher in the liver than other organs. As a result of this toxicity, National Institute for Occupational Safety and Health in 1976 established the limit for stibine at 0.1 ppm for an 8-hour exposure period.

Stibine removal would be particularly critical in submarines where large numbers of large, high capacity antimonial lead-acid batteries would be used in a closed environment. Only if effective means of stibine removal are provided can the advantages of the antimonial lead-acid cells be realized there.

Prior art methods of removing stibine from battery exhaust gases include the use of a granular bed of alumina or a mixture of alumina and lead dioxide on alumina (U.S. Pat. No. 3,102,059) heavy metal manganites (U.S. Pat. No. 4,048,387) and hot copper (U.S. Pat. No. 2,615,062). These methods are used to prevent stibine from poisoning catalysts used to recombine oxygen and hydrogen into water. They are used mainly in small storage batteries operating in open environments such as automobile batteries. These techniques do not provide the capacity or effectiveness which is needed for submarine batteries.

It would be desirable to provide an effective, long life filter for removing stibine from gases generated in large antimonial lead-acid batteries. It would also be desirable at a low cost, easily handled, safe material be used as the filtering agent.

SUMMARY OF THE INVENTION

Accordingly, an object of this invention is to provide a more effective method of removing stibine from gases generated during the charging of antimonial lead-acid batteries.

Another object, is to provide a new high capacity, long life method of filtering stibine from antimonial lead-acid battery vent gases.

A further object of this invention is to provide a easy method to maintain stibine filtering system for antimonial lead-acid batteries.

Still another object of this invention is to provide a stibine filtering system for antimonial lead-acid batteries which uses only common, inexpensive, chemically inert materials.

These and other objects of this invention are provided by providing means for filtering gases generated in antimonial lead-acid batteries through carbon powder (e.g., activated charcoal).

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein:

FIG. 3 is discussed in the experimental section.

DETAILED DESCRIPTION OF THE PREFERRED EMBODIMENT

Figure 1:
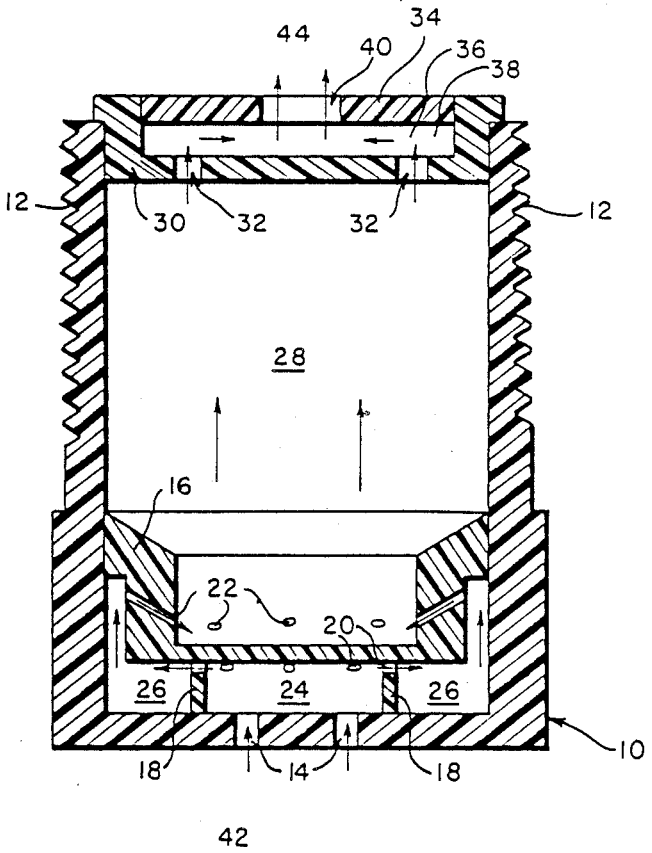
FIG. 1 is a vertical cross-sectional view of a stibine filter.

Briefly, referring to FIG. 1, the stibine filter may comprise a circular cover 30 fitted onto a cylindrical outer casing 10 with a cylindrical partition or insert 16 defining a cylindrical lower, entry chamber 24, an annular transfer chamber 26, and upper, filtration chamber 28. A cylindrical wall 18 forming the lowest portion of insert 16 separates the entry chamber 24 from the transfer chamber 26. The remainder of insert 16 separates the filtration chamber 28 from the transfer chamber 26 and the entry chamber 24. A plurality of holes 14 in the bottom of the outer casing 10 provide passages for the flow of gases evolved in the interior of the battery 42 into the entry chamber 24. A plurality of holes 20 in the cylindrical wall 18 provide passages for the flow of gases from the entry chamber 24 into the annular transfer chamber 26. A plurality of channels 22 provide means for the gases to flow from the annular transfer chamber 26 downward into the lower portion of the filtration chamber 28. The filtration chamber 28 contains activated charcoal powder which removes the stibine from the gas mixture. The channels 22 slant downward from the transfer chamber 26 to the filtration chamber 28 to prevent the activated charcoal from leaking out. The stibine is removed as the gas mixture flows up through the activated charcoal in the filtration chamber 28. The stibine free gases exit from the top of the filtration chamber 28 through a plurality of holes 32 in the cover 30. As shown in FIG. 1, the cover 30 has a recess 36 which contains a fiber glass matte 38 and a removable lid 34 which covers the recess 36. After the treated gases exit through the holes 32 in the cover 30, they flow through the glass matte 38 and out of the recess 36 through a hole 40 in the lid 34 into the environment or next stage of treatment. Finally, screw threads 12 on the outside of casing 10 allow the filter to be fitted into flash arresters as shown in FIG. 2.

Figure 2:
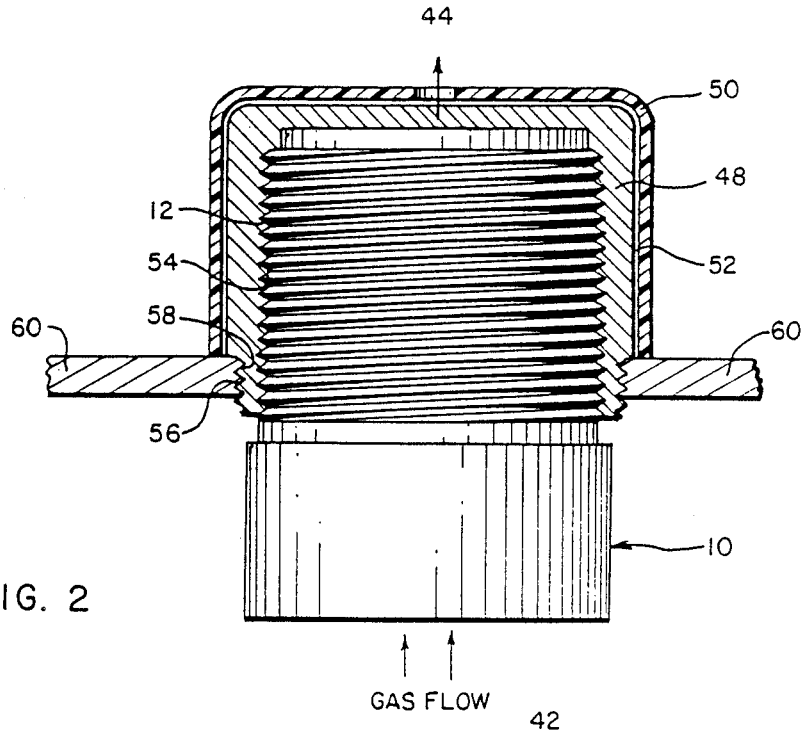
FIG. 2 is a vertical cross-sectional view showing the position of the stibine filter in relation to the flash arrester and the battery casing.

Referring to FIG. 2, threads 56 located on the outside of the bottom of the flash arrester 48 screw into corresponding threads 58 in a vent hole in the top of the battery case 60. A plexiglass cover 50 is placed over the flash arrester 48 leaving a space 52 in between. In operation, gases generated in the interior 42 of the battery pass through the filter (as shown in FIG. 1) and then through the flash arrester 48 and out of hole 62 in the top of the plexiglass cover 50 into the outer environment 44.

Periodically (e.g., every 60+ days) the active carbon powder is replaced. This can be done while the batteries remain in operation by using a spare flash arrester and filter. First, the plexiglass cover 50 is removed. The flash arrester 48 is then unscrewed (threads 56 and 58) and removed from the battery case 60. The filter, which is screwed (threads 12 and 54) into the flash arrester 48 also is removed. The reverse procedure is used to install the replacement flash arrester and fresh filter. The casing 10 of the used filter is unscrewed (threads 12 and 54) and removed from the flash arrester 48.

Referring again to FIG. 1, cover 30 is removed, exposing the filtration chamber 28 and the active charcoal powder it contains. The activated charcoal powder may simply be replaced or the filter may be broken down further for cleaning. Lid 34 may be removed from the cover 30, and insert 16 may be removed from the outer casing 10. After cleaning, reassembly, and refilling with fresh activated charcoal powder, the filter is screwed back into the flash arrester 48. The procedure is repeated to replace the next filter.

The filter parts (cover 30, removable lid 34, outer casing 10, and insert 16) are preferably made of polypropylene because it is strong, chemically inert, and easy to machine and process into the desired shapes. Other materials possessing these characteristics may also be used.

Carbon powders such as activated charcoal may be used. The size of the carbon powder particles is not critical, however, the finer powders provide more surface area and therefore are more effective. Particle sizes of −14 mesh (less than 1.40 mm) are preferred, with −30 mesh (less than 0.600 mm) being more preferred and with −60 mesh (less than 0.250 mm) being still more preferred.

Having generally described the invention the following examples are set forth for purposes of illustration. It will be understood that the invention is not limited to these examples, but is susceptible to different modifications that will be recognized by one of ordinary skill in the art.

EXPERIMENTAL

Standard U.S. Navy lead-acid cells were modified by replacing the positive lead (Pb) grids with lead (Pb) grids containing antimony (Sb) and cadmium (Cd). The description of the cells used in the tests is as follows:

| Cell | |
|---|---|
| Dimension | 1 × 1 × 4 feet |
| Weight | 1,000 Kg |
| Positive grid | Pb/1.48% Cd/1.45% Sb |
| Negative grid | Pf/0.042% Ca/0.346% Sn |
| Max. Discharge current | C = 5250 Amperes |
| Float voltage | 2.330 PVC (volt per cell) |

The cells were subjected to test regimes simulating battery use in submersible ship nuclear (SSN), submersible ship ballistic nuclear (SSBN), and ship nuclear (SN) applications. For each of the three regimes (SSN, SSBN, SN) three cells were cycled, each at a different voltage: 2.35V, 2.45V, 2.55V.

Figure 3:
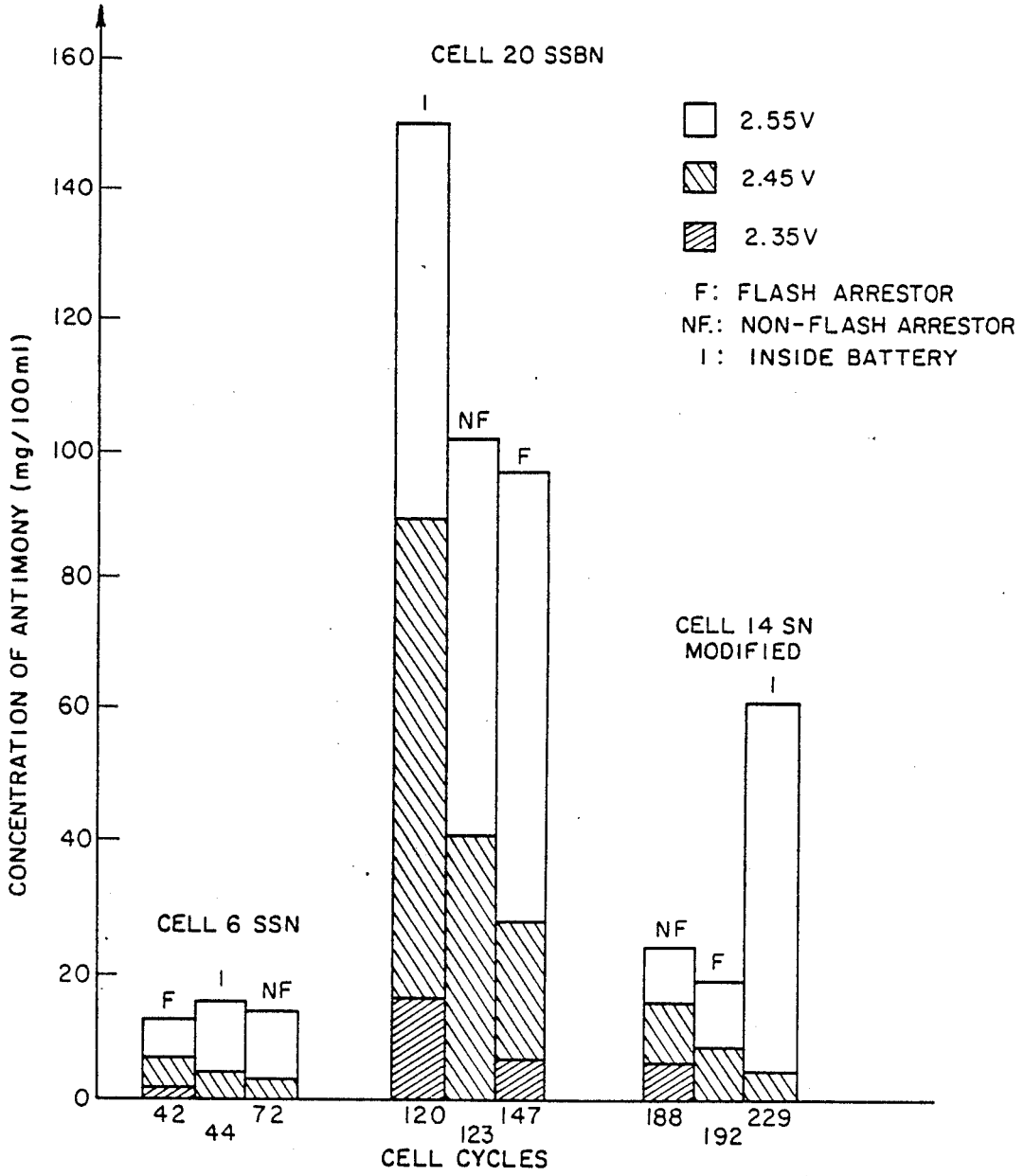
FIG. 3 is a bar graph presenting comparative data on stibine content in gases generated in antimonial lead-acid batteries.

FIG. 3 presents a summary of stibine measurements taken for each of the nine test cells during cycling. Each sample measured the stibine in gases generated in a cell for an approximately two hour period. For each of the nine test cells samples were taken in the interior of the cell (I), as the output of the flash arrester of the cell (F), and as the output of the cell with the flash arrester removed (NF). A solution of 0.1N $AgNO_3$ was used to trap the stibine. Gas analyses were performed by inductively coupled plasma (ICP) spectrometry. The limitation of this technique for stibine concentration was 0.1 mg per 100 ml solution or one part per million (PPM).

In FIG. 3 the abscissa gives the test cycle during which a given two hour sampling was taken and the ordinate gives the concentration of the trapped stibine in mg/100 ml. Each 0.1 mg/100 ml corresponds to 1 ppm of stibine.

The similarity of stibine amounts between flash arrester conditions and non flash arrester conditions shows the ineffectiveness of the alumina flash arrester in trapping stibine. The difference of stibine amounts found inside the battery and flash arrester or non flash arrester shows the instability of stibine. From the FIG. 3, it can be seen that the charge and discharge routine has a strong effect on the stibine generation from the lead antimony batteries. Stibine generation increased in the order of SSBN SN Modified SSN.

TESTS USING CHARCOAL FILTERS

Standard life cycle tests (SLT) were applied to cells of the same design as those used in the SSN, SSBN, and SN tests (Pb, 1.48 wt % Cd, 1.45 wt % Sb). Charcoal was used on the underside of the flash arrester of the circuit #4 (which has the highest cycle life) in an attempt to test its effectiveness in trapping stibine. Sixty (60) grams and one hundred twenty (120) grams of 30-mesh and 14-mesh charcoal respectively were found to be effective in filtering out the stibine for a period of five hours in the cell voltages of 2.35V and 2.55V.

FROM CHEMICAL MIXTURES

Several tests were also done at White Oak Laboratory to study the effectiveness of charcoal. For a period of twenty five hours, sixty (60) grams of 30-mesh charcoal was used effectively in trapping stibine which was generated from a chemical mixture (sodium borohydride, potassium hydroxide, tartaric acid and potassium antimony tartrate). Due to the change of the flash arrester to a smaller size, a second series of stibine tests was also done on the new flash arrester (3). Eight (8) grams of 30-mesh charcoal was used. The maximum concentration of stibine to absorb into 8 grams of 30-mesh charcoal was obtained at 90,000 ppm. The following are the chemical reactions:

(1) Sodium borohydride oxidizes potassium antimony tartrate in alkaline solution (potassium hydroxide) producing $SbO^+$ ions.

(2) $Sbo^+$ ion will convert to the stibine from the addition of sulfuric acid.

(3) Stibine diffuses through the flash arrester, absorbs onto the charcoal and decomposes into antimony and hydrogen. Spot test was performed on the activated charcoal showing the positive test for antimony. As the amount of stibine increases to the maximum of 90,000 ppm for eight (8) grams of 30-mesh charcoal, the surface of the activated charcoal will be saturated with antimony and will no longer be effective in absorbing stibine.

Obviously, numerous modifications and variations of the present invention are possible in light of the above teachings. It is therefore to be understood that, within the scope of the appended claims, the invention may be practiced otherwise than as specifically described.

What is claimed as new and desired to be secured by Letters Patents of the United States is:

1. A process for removing stibine from the gases generated by antimonial lead-acid batteries comprising filtering the gases through activated charcoal which causes the stibine to decompose into antimony metal which is deposited on the charcoal and hydrogen gas which is carried away in the exiting gases.

2. The process of claim 1 wherein −14 mesh activated charcoal powder is used.

3. The process of claim 2 wherein −30 mesh activated charcoal powder is used.

4. The process of claim 3 wherein −60 mesh activated charcoal powder is used.

* * * * *